United States Patent
Bödiger et al.

(10) Patent No.: US 6,696,542 B1
(45) Date of Patent: Feb. 24, 2004

(54) POLYCARBONATE SUBSTRATES

(75) Inventors: Michael Bödiger, League City, TX (US); Steffen Kühling, Meerbusch (DE); Franky Bruynseels, Sint-Gillis-Waas (BE); Dirk van Meirvenne, Chonburi (TH); René de Cleyn, Wuustwezel (BE)

(73) Assignees: Bayer Aktiengesellschaft, Leverkusen (DE); Bayer Antwerpen, N.V., Antwerp (BE)

( * ) Notice: Subject to any disclaimer, the term of this patent is extended or adjusted under 35 U.S.C. 154(b) by 3 days.

(21) Appl. No.: 10/111,897

(22) PCT Filed: Oct. 23, 2000

(86) PCT No.: PCT/EP00/10400

§ 371 (c)(1), (2), (4) Date: Aug. 5, 2002

(87) PCT Pub. No.: WO01/32754

PCT Pub. Date: May 10, 2001

(30) Foreign Application Priority Data

Nov. 3, 1999 (DE) ......................... 199 52 851

(51) Int. Cl.$^7$ ................................ C08G 64/00
(52) U.S. Cl. .................... 528/196; 264/176.1; 428/412; 528/198
(58) Field of Search ...................... 264/176.1; 428/412; 528/196, 198

(56) References Cited

FOREIGN PATENT DOCUMENTS

| DE | 19952851 | * | 5/2001 |
| EP | 0 359 953 | | 3/1990 |
| JP | 7-196783 | | 8/1995 |

* cited by examiner

*Primary Examiner*—Terressa Boykin
(74) *Attorney, Agent, or Firm*—Joseph C. Gil; Aron Preis

(57) ABSTRACT

Polycarbonate substrates, the preparation of which is based on 1,1-bis-(4-hydroxyphenyl)-3,3,5-trimethylcyclohexanone, and their use for producing shaped articles with particularly high purity and extremely high surface brilliance and also the shaped articles which can be produced from the polycarbonate substrate are described.

8 Claims, No Drawings

POLYCARBONATE SUBSTRATES

The invention relates to polycarbonate substrates, the preparation of which is based on 1,1-bis-(4-hydroxyphenyl)-3,3,5-trimethylcyclohexanone, and their use for producing shaped articles with particularly high purity and extremely high surface brilliance and also the shaped articles which can be produced from the polycarbonate substrate.

High purity polycarbonate is required for certain shaped articles, such as in particular glazing for vehicles and headlamp diffusers for vehicle reflectors, in which high light transmission without any defects in the moulded item is of enormous importance.

Polycarbonate is prepared by the so-called phase boundary process, in which dihydroxydiarylalkanes in the form of their alkali metal salts are reacted with phosgene in the heterogeneous phase in the presence of inorganic bases such as sodium hydroxide solution and an organic solvent in which the product polycarbonate is readily soluble. During the reaction the aqueous phase is dispersed in the organic phase and after reaction the organic, polycarbonate-containing phase is washed with an aqueous liquid, wherein inter alia electrolytes are removed, and the wash liquid is then separated off.

Japanese application JP-A 07 19 67 83 describes a process for the preparation of polycarbonate in which the content of iron in the sodium hydroxide solution used should be below 2 ppm in order to achieve favourable colour properties.

The object of the present invention is the provision of an alternative and improved process for the preparation of pure polycarbonate substrates and also to provide polycarbonate shaped articles with especially high purity.

Surprisingly, it has now been found that polycarbonate shaped articles with especially high surface brilliance and purity can be obtained from polycarbonate substrates, the preparation of which is based on 1,1-bis-(4-hydroxyphenyl)-3,3,5-trimethylcyclohexanone, with average molecular weights of 25,000 to 400,000 and which are prepared by a specific process.

The present application therefore provides polycarbonate substrates, the preparation of which is based on 1,1-bis-(4-hydroxyphenyl)-3,3,5-trimethylcyclohexanone, with a number of defects per $m^2$ of fewer than 250, in particular fewer than 150, measured on a 200 µm extruded film.

The application also provides shaped articles and films, in particular glazing for vehicles and headlamp diffusers for car reflectors based on polycarbonate substrates, the preparation of which is based on 1,1-bis-(4-hydroxyphenyl)-3,3, 5-trimethylcyclohexanone, with a number of defects per $m^2$ of fewer than 250, in particular fewer than 150, measured on a 200 µm extruded film.

Polycarbonate substrates according to the invention are obtained by using a specific process.

The application therefore provides a process for the preparation of polycarbonate by the phase boundary process, wherein dihydroxydiarylalkanes in the form of their alkali metal salts are reacted with phosgene in the heterogeneous phase in the presence of sodium hydroxide solution and an organic solvent, characterised in that
- a) the feedstocks are low in Fe, Cr, Ni, Zn, Ca, Mg, Al metals or their homologues
- b) the organic solvent is separated off and
- c) the polycarbonate obtained is worked up.

In the context of the invention, low in the metals mentioned or their chemical homologues means that the feedstocks preferably contain not more than 2 ppm, more preferably not more than 1 ppm and particularly preferably not more than 0.5 ppm and most particularly preferably not more than 0.2 ppm of total metal, in particular of the metals mentioned above and their homologues. The alkali metals are excluded from these limit values.

The feedstock sodium hydroxide solution should preferably be low in the metals mentioned. In particular, in relation to a 100 wt. % strength NaOH content, the sodium hydroxide solution should contain not more than 1 ppm, preferably not more than 0.5 ppm, more preferably not more than 0.3 ppm of an alkaline earth metal or its homologues. In particular, the feedstock sodium hydroxide solution should contain, in relation to a 100 wt. % strength NaOH content, not more than 1 ppm, preferably not more than 0.5 ppm, more preferably not more than 0.1 ppm of iron.

The sodium hydroxide solution is preferably used as a 20–55 wt. % strength, particularly preferably 30–50 wt. % strength solution in the process according to the invention.

A sodium hydroxide solution with the afore-mentioned limit values can be obtained by the membrane process known from the literature.

In a preferred embodiment, apart from the sodium hydroxide solution, the feedstock bisphenol, in particular bisphenol and water, most particularly preferably bisphenol, water and organic solvent are also low in metals, in particular low in Fe, Cr, Ni, Zn, Ca, Mg, Al.

Embodiments in which a sodium bisphenolate (solution) has previously been prepared from sodium hydroxide solution and bisphenol(s) are also included here.

These low-metal feedstocks are obtained by a procedure in which in a preferred embodiment the solvent is distilled, the bisphenol is crystallised, preferably crystallised several times or distilled, and fully deionised water is used.

The fully deionised water is preferably desalinated, degassed and/or desilicified. The electrical conductivity (sum parameter for ionogenic substances of the salt which are still present in trace amounts in the water), for instance, is used as a quality criterion, the fully deionised water in the process according to the invention being characterised by an electrical conductivity of 0.2 µS/cm (DIN 38404 C 8) and an $SiO_2$ concentration of 0.02 mg/kg (VGB 3.3.1.1) or in each case less.

The content of dissolved oxygen in the fully deionised water is preferably less than 1 ppm, more preferably less than 100 ppb.

In a further preferred embodiment, from among the group of feedstocks at least the sodium hydroxide solution, preferably also the bisphenol, particularly preferably the sodium hydroxide solution, the bisphenol and the water, most particularly preferably the sodium hydroxide solution, the bisphenol, the water and the organic solvent are filtered at least once, preferably twice, most particularly preferably stepwise three times, before starting the reaction.

The invention also provides a process for the preparation of polycarbonate by the phase boundary process, wherein dihydroxydiarylalkanes in the form of their alkali metal salts are reacted with phosgene in the heterogeneous phase in the presence of sodium hydroxide solution and an organic solvent, characterised in that
- a) the feedstocks are low in Fe, Cr, Ni, Zn, Ca, Mg, Al metals or their homologues
- b) the organic solvent is separated off and
- c) the polycarbonate obtained is worked up;
- d) the aqueous phase being produced during reaction is separated off and the separated organic polycarbonate phase is washed with an aqueous liquid and
- e) the organic polycarbonate phase which has been washed and separated off from the wash liquid, optionally after filtration, is heated and filtered hot at least once.

In a preferred embodiment, the reaction mixture is filtered directly after reaction in process step d) and/or the organic polycarbonate phase which is obtained and separated is filtered and/or the organic polycarbonate phase obtained in process step e) is filtered.

Preferably at least two of these filtrations, in particular all three filtrations, are performed.

In a preferred embodiment, especially in the case of hot filtration, the mixture is filtered at least once, preferably twice, particularly preferably three times, in particular stepwise. In the case of stepwise filtration, coarser filters are used first and then these are replaced by finer filters. It is preferable to carry out the filtration of the two-phase media in process step d) with coarser filters.

In process step e), filters with smaller pore sizes are used for hot filtration. In this case it is important that the polycarbonate phase is present as the most homogeneous solution possible. This is achieved by heating the organic polycarbonate phase, which generally still contains residues of aqueous wash liquid. The wash liquid is then dissolved and a clear solution is formed. The previously dissolved impurities, in particular dissolved alkali metal salts, precipitate out and can be filtered off.

In order to achieve a homogeneous solution, the well-known freezing out process may be used in addition to the process described above.

To perform filtration in accordance with the invention, membrane filters and sintered metal filters or also bag filters may be used as filters. The pore size of the filters is generally 0.01 to 5 μm, preferably 0.02 to 1.5 μm, more preferably about 0.05 to 1.0 μm. These types of filters are commercially available, for example from Pall GmbH, D-63363 Dreieich, and Krebsböge GmbH, D-42477 Radevormwald (SIKA-R CU1AS type).

Significantly better filter service lives are obtained by the combination in the process according to the invention.

Performing the other process steps is generally well-known. Thus, the aqueous phase is emulsified in the organic phase during reaction. Droplets of varying size are then produced. After reaction, the organic polycarbonate-containing phase is normally washed several times with an aqueous liquid and separated as far as possible from the aqueous phase after each washing operation. Washing is preferably performed with very finely filtered, low-metal water. The polymer solution is normally cloudy after washing and separation of the wash liquid. The wash liquids used are an aqueous liquid to separate the catalyst, a dilute mineral acid such as HCl or $H_3PO_4$, and completely desalinated water for further purification. The concentration of HCl or $H_3PO_4$ in the wash liquid may be, for example, 0.5 to 1.0 wt. %. The organic phase is washed, for example and preferably, five times.

Phase separation devices which can be used for separating off the wash liquid from the organic phase are the separation vessels, phase separators, centrifuges or coalescers which are known in principle, or also combinations of these devices.

To obtain the high purity polycarbonate, the solvent is evaporated off. Evaporation may take place in several evaporator stages. In accordance with a further preferred embodiment of this invention, the solvent or some of the solvent is removed by spray drying. The high purity polycarbonate is then obtained as a powder. The same applies to obtaining the high purity polycarbonate by precipitation from the organic solution and then residual drying. Extrusion, for example, is a suitable means of evaporating residual solvent. Strand evaporation technology is another means.

1,1-bis-(4-hydroxyphenyl)-3,3,5-trimethylcyclohexanone and 2,2-bis-(4-hydroxyphenyl)-propane (BPA/bisphenol A), optionally a mixture of these, are used as bisphenols, wherein 1,1-bis-(4hydroxyphenyl)-3,3,5-trimethylcyclohexanone is always present in amounts >0.1 mol. %. The concentration of 1,1-bis-(4-hydroxyphenyl)-3,3,5-trimethylcyclohexanone is preferably in the range 10 to 100 mol. %. The bisphenol compounds being used according to the invention are reacted with carbonic acid compounds, in particular phosgene.

The polyester carbonates are obtained by reacting the bisphenols already mentioned, with at least one aromatic dicarboxylic acid and optionally carbonic acid. Suitable aromatic dicarboxylic acids are, for example, orthophthalic acid, terephthalic acid, isophthalic acid, 3,3'- or 4,4'-diphenyldicarboxylic acid and benzophenonedicarboxylic acid.

Inert organic solvents used in the process are, for example, dichloromethane, the various dichloroethanes and chloropropane compounds, chlorobenzene and chlorotoluene; dichloromethane and mixtures of dichloromethane and chlorobenzene are preferably used.

The reaction can be accelerated by catalysts such as tertiary amines, N-alkylpiperidines or onium salts. Tributylarnine, triethylamine and N-ethylpiperidine are preferably used. A monofunctional phenol such as phenol, cumylphenol, p-tert.-butylphenol or 4-(1,1,3,3-tetramethylbutyl)-phenol may be used as a chain terminator and molecular weight regulator. Isatin-biscresol, for example, may be used as a branching agent.

To prepare high purity polycarbonates, the bisphenols are dissolved in an aqueous alkaline phase, preferably sodium hydroxide solution. The chain terminators optionally required for the preparation of copolycarbonates are dissolved in the aqueous alkaline phase in amounts of 1.0 to 20.0 mol. % per mol of bisphenol or added to this as such or dissolved in an inert organic phase. Then phosgene is passed into the mixer which contains the remainder of the reaction constituents and polymerisation is performed.

Optionally used chain terminators are both monophenols and monocarboxylic acids. Suitable monophenols are phenol itself, alkylphenols such as cresols, p-tert.-butylphenol, p-cumylphenol, p-n-octylphenol, p-iso-octylphenol, p-n-nonylphenol and p-iso-nonylphenol, halophenols such as p-chlorophenol, 2,4-dichlorophenol, p-bromophenol and 2,4,6-tribromophenol and mixtures of these.

Suitable monocarboxylic acids are benzoic acid, alkylbenzoic acids and halobenzoic acids.

Preferred chain terminators are phenols of the formula (I)

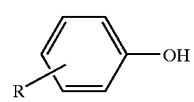

(I), in which

R is hydrogen, tert.-butyl or a branched or unbranched $C_8$- and/or $C_9$-alkyl radical.

The preferred chain terminators are phenol and p-tert.-butylphenol.

The amount of chain terminator to be used is 0.1 mol. % to 5 mol. %, with respect to moles of each of the diphenols used. The addition of a chain terminator may take place before, during or after phosgenation.

Optionally, a branching agent may also be added to the reaction. Preferred branching agents are the trifunctional or more than trifunctional compounds known from polycarbonate chemistry, in particular those with three or more than three phenolic OH groups.

Branching agents are also, for example and preferably, phloroglucine, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methyl-phenol, 2-(4-hydroxyphenyl)-2-(2,4-dihydroxyphenyl)-propane, esters of hexa-(4-(4-hydroxyphenyl-isopropyl)-phenyl)-orthoterephthalic acid, tetra-(4-hydroxyphenyl) methane, tetra-(4-(4-hydroxyphenyl-isopropyl)-phenoxy)-methane and 1,4-bis-(4',4''-dihydroxytriphenyl)-methyl)-benzene and also 2,4-dihydroxybenzoic acid, trimesic acid, cyanuric chloride and 3,3-bis-(3-methyl-4-hydroxyphenyl)-2-oxo-2,3-dihydroindole.

The amount of optionally used branching agent is 0.05 mol. % to 2 mol. %, again with respect to moles of each of the diphenols used.

The branching agent may either be initially introduced in the aqueous alkaline phase with the diphenols and the chain terminators, or be added as a solution in an organic solvent before phosgenation.

Some, up to 80 mol. %, preferably 20 to 50 mol. %, of the carbonate groups in the polycarbonates may be replaced by aromatic dicarboxylic ester groups.

Polycarbonates according to the invention are either homopolycarbonates or copolycarbonates and their mixtures. Polycarbonates according to the invention may be aromatic polyester carbonates or polycarbonates which are present in a mixture with aromatic polyester carbonates. The term polycarbonate stands representatively for the polycarbonate substrates obtainable by the processes according to the invention.

The polycarbonates have average molecular weights $M_w$ (determined by measuring the relative viscosity at 25° C. in dichloromethane and at a concentration of 0.5 g of polycarbonate per 100 ml of dichloromethane) of 12,000 to 400,000, preferably 23,000 to 80,000 and in particular 24,000 to 40,000.

Shaped articles according to the invention which are produced from the high purity polycarbonate substrates according to the invention are in particular glazing for motor vehicles and headlamp diffusers for car reflectors in which high light transmission without any defects in the moulded item is of enormous importance. These shaped articles are produced by injection moulding, extrusion and extrusion blow moulding processes using the polycarbonate according to the invention with a suitable molecular weight.

Shaped articles and films according to the invention are characterised by an extremely low defect rate in the film laser scan test and an extremely low cloudiness of less than 0.5%, in particular 0.4% in a cloudiness measurement. Shaped articles according to the invention have fewer than 300, in particular fewer than 250, preferably fewer than 150 defects per $m^2$ measured on a 200 $\mu m$ extruded film.

The following examples serve to explain the invention. The invention is not limited to the examples.

EXAMPLES

To prepare the polycarbonate, an aqueous sodium bisphenolate/disodium 1,1-bis-(4-hydroxylate phenyl)-3,3-dimethyl-5-methylcyclohexanone solution (57 mol. %: 43 mol. %), made from 1,1-bis-(4-hydroxylate phenyl)-3,3-dimethyl-5-methyl-cyclohexanone (residual oxygen being removed prior to dissolution in a stirred tank by applying a vacuum and then introducing nitrogen 5 times) and sodium hydroxide solution is dissolved with the exclusion of oxygen, and this is mixed with a solution of BPA (BPA is brought together continuously as a melt with sodium hydroxide solution) in sodium hydroxide solution with the exclusion of oxygen. The sodium hydroxide solution used has different concentrations and purities (see table 1), wherein the original sodium hydroxide solution is diluted still further to a 6.5% strength sodium hydroxide solution to dissolve the bisphenols. This sodium bisphenolate solution is now filtered through a 0.6 $\mu a$ filter and used in the polycarbonate reaction. After reaction, the reaction solution is filtered through a 1.0 $\mu nom$ bag filter and supplied for washing. Here, the mixture is washed with 0.6% hydrochloric acid and then post-washed with filtered fully deionised water another 5 times. The organic solution is separated off from the aqueous solution and after heating the organic solution to 55° C. it is filtered first with a 0.6 $\mu a$ filter and then through a 0.2 $\mu a$ filter. After isolation, poly-1,1-bis-(4hydroxyphenyl)-3,3-dimethyl-5-methylcyclohexanone-co-2,2-bis-(4-hydroxyphenyl)-propane carbonate is obtained. The polycarbonate obtained has an average molecular weight $M_w$ of 31,000.

TABLE 1

| Quality of sodium hydroxide solution | | | |
|---|---|---|---|
| | 1 | 2 | 3 |
| % NaOH | 50 | 50 | 32 |
| Fe (ppm) | 0.7 | 0.46 | 0.02 |
| Ca (ppm) | 2.0 | 0.4 | <0.1 |
| Mg (ppm) | 0.5 | 0.2 | <0.1 |
| Ni (ppm) | 0.2 | 0.2 | <0.01 |
| Cr (ppm) | 0.4 | 0.25 | <0.01 |
| Zn (ppm) | 0.1 | 0.05 | 0.06 |
| Total (ppm) | 3.9 | 1.56 | <0.3 |
| Conc. in 100% NaOH | 1 | 2 | 3 |
| Fe (ppm) | 1.4 | 0.9 | 0.06 |
| Ca (ppm) | 4.0 | 0.8 | <0.3 |
| Mg (ppm) | 1.0 | 0.4 | <0.3 |
| Ni (ppm) | 0.4 | 0.4 | <0.03 |
| Cr (ppm) | 0.8 | 0.5 | <0.03 |
| Zn (ppm) | 0.2 | 0.1 | 0.19 |
| Total (ppm) | 7.8 | 3.1 | <0.9 |

The filter service lives for various filter locations are, for the individual cases:

TABLE 2

| | Sodium hydroxide prepared from experiment no. | | |
|---|---|---|---|
| Filter service life | 1 | 2 | 3 |
| Before reaction 0.6 $\mu a$ filter | 12 h | 10 d | 30 d |
| After reaction 1.0 $\mu a$ filter | 24 h | 30 d | >60 d |
| End filter 1 = 0.6 $\mu a$ filter | 12 h | 3 d | 21 d |
| End filter 2 = 0.2 $\mu a$ filter | | | |

Films are now extruded from the polycarbonates prepared with sodium hydroxide solution from experiments 1 to 3 and these are subjected to a film laser scan test using the known method. The extruded film is 200 $\mu m$ thick and 60 mm wide. A He/Ne laser ("spot diameter" of 0.1 mm) scanned the film with a scan frequency of 5000 Hz across the width and with a transportation speed of 5 m/s in the longitudinal direction. In this way all defects which caused scattering of the transmitted laser beam (from 0.10 mm diameter upwards) were detected by a photomultiplier and counted by software. The number of optical defects per kg of polycarbonate or per m² of film is a measure of the surface quality of this film and the purity of the PC.

| Evaluating the extruded film with a laser scanner | | | |
|---|---|---|---|
| | PC prepared using sodium hydroxide solution from experiment no. | | |
| # per m² of surface | 1 | 2 | 3 |
| 0.10–0.30 mm | 194 | 99 | 53 |
| >0.30 mm | 216 | 128 | 72 |
| Total | 410 | 227 | 125 |

Solid sheets for car windows and headlamps are produced from the polycarbonates prepared with sodium hydroxide solution from experiments 1 to 3. The polycarbonates prepared with sodium hydroxide solution from experiment 3 had a smaller proportion of glare and a higher luminous efficiency.

Colour sample platelets are produced from the polycarbonates of different qualities. The colour sample platelets had, according to ASTM D1003, different cloudinesses. The colour sample platelets (4 mm thick) produced with sodium hydroxide solution from experiment 3 had a particularly low cloudiness of 0.4%, which leads to less diffuse light scattering when used as glazing/headlamp diffusers.

What is claimed is:

1. Polycarbonate substrates, the preparation of which is based on 1,1-bis-(4-hydroxyphenyl)-3,3,5-trimethylcyclohexanone, with fewer than 300 defects per m², measured on a 200 μm extruded film.

2. Polycarbonate substrates, the preparation of which is based on 1,1-bis-(4-hydroxyphenyl)-3,3,5-trimethylcyclohexanone, with fewer than 250 defects per m², measured on a 200 μm extruded film.

3. A process for the preparation of polycarbonate shaped articles with a small number of defects, characterised in that polycarbonate substrates as defined in claim 1 are used as the starting substrates.

4. Shaped articles prepared from polycarbonate based on 1,1-bis-(4-hydroxyphenyl)-3,3,5-trimethylcyclohexanone, with fewer than 300 defects per m², measured on a 200 μm extruded film.

5. Shaped articles according to claim 4 with a cloudiness of less than 0.5%.

6. Disks produced from polycarbonate based on 1,1-bis-(4-hydroxyphenyl)-3,3,5-trimethylcyclohexanone, with fewer than 300 defects per m², measured on a 200 μm extruded film and with a cloudiness of less than 0.5%.

7. Sheets produced from polycarbonate based on 1,1-bis-(4-hydroxyphenyl)-3,3,5-trimethylcyclohexanone, with fewer than 300 defects per m², measured on a 200 μm extruded film and with a cloudiness of less than 0.5%.

8. A method of using the polycarbonate substrate of claim 1 comprising producing a molded article.

* * * * *

UNITED STATES PATENT AND TRADEMARK OFFICE
CERTIFICATE OF CORRECTION

PATENT NO. : 6,696,542 B1
DATED : February 24, 2004
INVENTOR(S) : Michael Bodiger et al.

It is certified that error appears in the above-identified patent and that said Letters Patent is hereby corrected as shown below:

Column 1,
Lines 4-5, 37-38, 42-43 and 49-50, please delete
"1,1-bis-(4-hydroxyphenyl)-3,3,5-trimethylcyclohexanone" and insert
-- 1,1-bis-(4-hydroxyphenyl)-3,3,5-trimethylcyclohexane --

Column 4,
Lines 1, 4-5 and 6-7, please delete
"1,1-bis-(4-hydroxyphenyl)-3,3,5-trimethylcyclohexanone" and insert
-- 1,1-bis-(4-hydroxyphenyl)-3,3,5-trimethylcyclohexane --

Column 5,
Lines 64-65 and 66-67, please delete
"1,1-bis-(4-hydroxyphenyl)-3,3,5-trimethylcyclohexanone" and insert
-- 1,1-bis-(4-hydroxyphenyl)-3,3,5-trimethylcyclohexane --

Column 6,
Lines 20-22, please delete
"poly-1,1-bis-(4-hydroxyphenyl)-3,3-dimethyl-5-methylcyclohexanone-co-2,2-bis-(4-hydroxyphenyl)-propane" and insert
-- poly-1,1-bis-(40hydroxyphenyl)-3,3-dimethyl-5-methylcyclohexane-co-2,2-bis-(4-hydroxyphenyl)-propane) --.

Column 8,
Lines 3-4, 7-8, 15, 21-22 and 25-26, please delete
"1,1-bis-(4-hydroxyphenyl)-3,3,5-trimethylcyclohexanone" and insert
-- 1,1-bis-(4-hydroxyphenyl)-3,3,5-trimethylcyclohexane --

Signed and Sealed this

Nineteenth Day of April, 2005

JON W. DUDAS
*Director of the United States Patent and Trademark Office*